United States Patent [19]

Kerschner

[11] Patent Number: 5,531,434
[45] Date of Patent: Jul. 2, 1996

[54] MULTIPLE PAGE SENSOR FOR AUTOMATIC DOCUMENT FEEDER

[75] Inventor: Ronald K. Kerschner, Loveland, Colo.

[73] Assignee: Hewlett-Packard Company, Palo Alto, Calif.

[21] Appl. No.: 349,641

[22] Filed: Dec. 5, 1994

[51] Int. Cl.⁶ .................................................. B65H 7/12
[52] U.S. Cl. .................... 271/263; 271/265.04; 340/674; 340/675; 324/662; 324/671
[58] Field of Search .................... 340/674, 675; 324/661, 662, 671, 686; 271/262, 263, 265.04

[56] References Cited

U.S. PATENT DOCUMENTS

| | | | |
|---|---|---|---|
| 3,519,922 | 7/1970 | Nash et al. | 324/671 |
| 3,609,735 | 9/1971 | Dauterman et al. | 271/263 |
| 3,646,372 | 2/1972 | Snellman et al. | 340/675 |
| 4,243,216 | 1/1981 | Mazumder | 271/263 |
| 4,504,961 | 3/1985 | Horiguchi | 271/263 |
| 4,766,368 | 8/1988 | Cox | 324/662 |
| 5,076,566 | 12/1991 | Kriegel | 340/675 |
| 5,168,239 | 12/1992 | Witskip | 324/671 |
| 5,418,467 | 5/1995 | Floch et al. | 324/671 |

FOREIGN PATENT DOCUMENTS

| | | | |
|---|---|---|---|
| 6-201313 | 7/1994 | Japan | 324/671 |
| 1259175 | 9/1986 | U.S.S.R. | 324/671 |

*Primary Examiner*—H. Grant Skaggs

[57] ABSTRACT

Page sensor apparatus for producing a signal related to a thickness of a sheet of paper may comprise a base plate and a foot plate positioned in opposed relation. The base and foot plates are arranged to allow the paper to pass therebetween, so that the base and foot plates become separated by a distance substantially equal to the thickness of the sheet of paper. Capacitance sensing apparatus connected to the base plate and the foot plate senses changes in the electrical capacitance of the base and foot plates and generates an output signal related thereto, the output signal being related to the plate separation, thus paper thickness.

14 Claims, 2 Drawing Sheets

MULTIPLE PAGE SENSOR FOR AUTOMATIC DOCUMENT FEEDER

BACKGROUND

This invention relates to document handling systems in general and more specifically to paper sensors for document handling systems having automatic paper feeders.

Document handling systems with automatic paper feeders are found in a wide range of devices, such as photocopy machines, facsimile machines, document scanners, and printers for computers, just to name a few. Most document handling systems in use today utilize one or more paper sensors to sense the location of paper as it moves through the various paper paths within the machine. Such paper sensors allow the control system of the machine to monitor the progress of the paper as it passes through the paper path, as well as to synchronize and coordinate the various paper handling functions.

A typical paper sensor comprises a moveable sensing vane connected to a switch. The switch may be either mechanical or optical and will be in one state when paper is present in the path and the opposite state when there is no paper in the path. Paper moving through the paper path displaces the sensing vane, which causes the switch to change back and forth between states. By sensing the current state of the switch, as well as the length of time that the switch remains in that particular state, the control system can determine whether paper is present at that location, as well as how long the paper has been at that location. Such information allows the control system to detect no-feeds and jams.

For example, if paper is not present in the path at the correct time during a paper feed cycle, then a no-feed or jam has occurred. Similarly, jams that occur while the paper is present at the sensor location may be detected by monitoring the length of time that the paper is sensed. If the time is longer than the time the paper should be at that station, then a jam has occurred.

While paper sensors of the type described above are useful in detecting paper jams and no-feeds, they cannot detect a multiple page feed, that is, a feed that occurs when two or more sheets of paper are fed through the paper path at the same time. Of course, if a multiple page feed occurs with original documents being copied, such as, for example, by a copy machine, then the second sheet will not be copied. Multiple page feeds also pose a problem in automatic document feeders for scanners used to scan paper sheets into an electronic database, since the operator must constantly monitor the scanner to ensure that no pages are skipped.

Consequently, there remains a need for a paper sensor for document handling systems that can not only detect paper jams and no-feeds, but that can detect multiple page feeds as well.

SUMMARY OF THE INVENTION

The invention may comprise a page sensor apparatus for producing a signal related to a thickness of a sheet of paper. The page sensor may include a base plate and a foot plate positioned in opposed relation. The base and foot plates are arranged to allow the paper to pass therebetween, so that the base and foot plates become separated by a distance substantially equal to the thickness of the sheet of paper. Capacitance sensing apparatus connected to the base plate and the foot plate senses changes in the electrical capacitance of the base and foot plates and generates an output signal related thereto, the output signal being related to the plate separation, thus paper thickness.

The invention may also comprise a method of producing a signal related to the thickness of a sheet of paper. This method may comprise the steps of: Moving the sheet of paper between the base and foot plates, detecting the electrical capacitance of the base and foot plates, and generating an output signal related thereto.

BRIEF DESCRIPTION OF THE DRAWING

Illustrative and presently preferred embodiments of the invention are shown in the accompanying drawing in which.

DETAILED DESCRIPTION OF THE INVENTION

Figure 1:
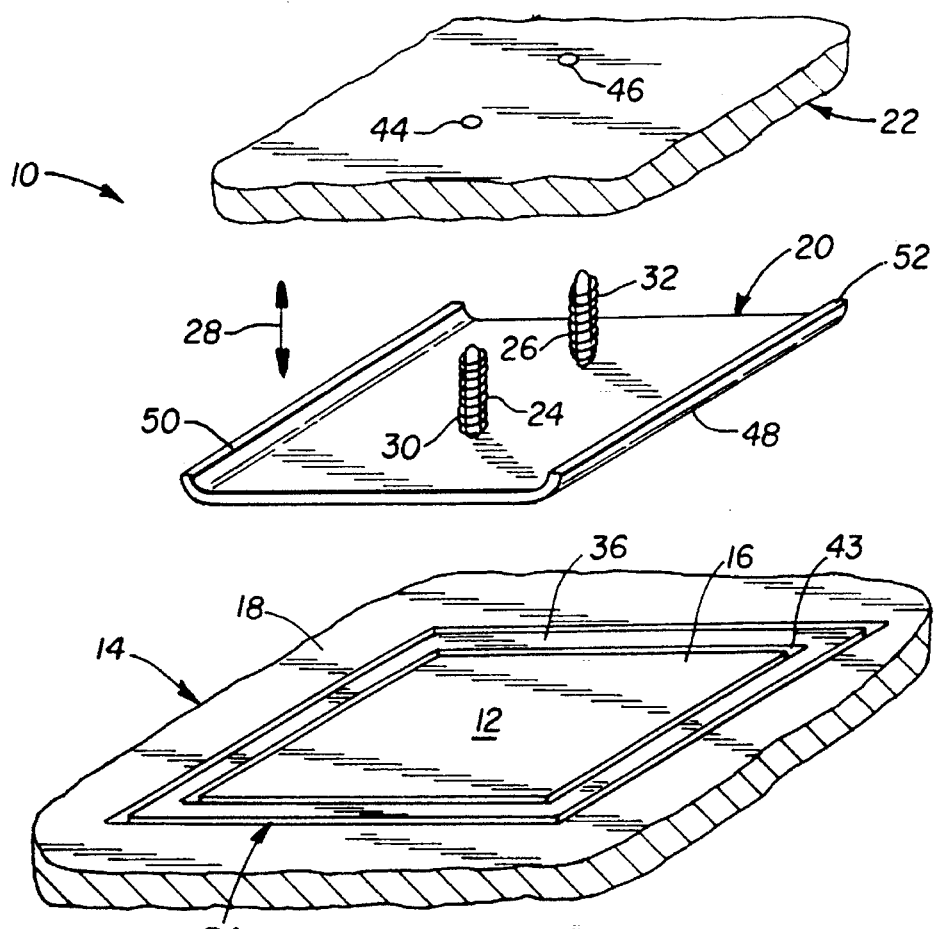
FIG. 1 is an exploded view in perspective of the page sensor apparatus.

A page sensor apparatus 10 is best seen in FIG. 1 as it could be used in a document handling system (not shown), such as a photocopy machine, facsimile machine, etc. having an automatic paper feeder. In one preferred embodiment, the page sensor apparatus 10 comprises a generally rectangular base plate 12 mounted in a chassis 14, which may be part of the document handling system. Base plate 12 is recessed within chassis 14 so that its top surface 16 is substantially flush with the top surface 18 of chassis 14. Base plate 12 is also mounted so that it is electrically isolated from the chassis 14. A generally rectangular moveable foot plate 20 is mounted to an opposed frame member 22 by any convenient means, such as a pair of mounting pins 24, 26, so that moveable foot plate 20 is held in parallel relation to base plate 12 and is free to move in the direction of arrow 28. A pair of biasing members, such as springs 30, 32 may be used to bias foot plate 20 toward base plate 12. Page sensor apparatus 10 may also include a shield member 34 mounted within chassis 14 so that its top surface 36 is also substantially flush with the top surfaces 16, 18 of base plate 12 and chassis 14, respectively. Shield member 34 is mounted so that it is electrically isolated from both chassis 14 and base plate 12. The entire page sensor apparatus 10 may be mounted at an appropriate point in the paper path of the document handling system, so that paper 38 passing through the paper path will pass between base plate 12 and foot plate 20, as best seen in FIG. 2.

The base plate 12 and foot plate 20 are connected to a capacitance sensing apparatus 40 (FIG. 3), which senses the change in capacitance between the base and foot plates 12 and 20 as the paper 38 slides therebetween. As will be explained in greater detail below, the capacitance of base and foot plates 12 and 20 is inversely related to the distance separating the plates, i.e., the capacitance of the plates 12, 20 is greatest when the distance separating them is the smallest, all other things being equal. A piece of paper 38 sliding between the base and foot plates 12 and 20 moves foot plate 20 away from base plate 12, thus increasing the separation between the plates and decreasing the capacitance. The change in capacitance between the plates is detected by the capacitance sensing apparatus 40, which then produces an output signal related thereto. The resulting output signal may be further processed as necessary to detect the presence of multiple page feeds, as well as jams and no-feeds.

A significant advantage of the page sensor apparatus 10 is that it is sensitive to paper thickness and thus may be used to detect multiple page feeds or may be used to detect paper that is either too thick or too thin to be reliably handled by the paper feed mechanism of the document handling system. In addition, the page sensor apparatus can also detect paper jams and no-feeds and thus may be substituted for the vane type of paper detectors described above. The page sensor apparatus 10 also has the advantage of mechanical simplicity.

Figure 2:
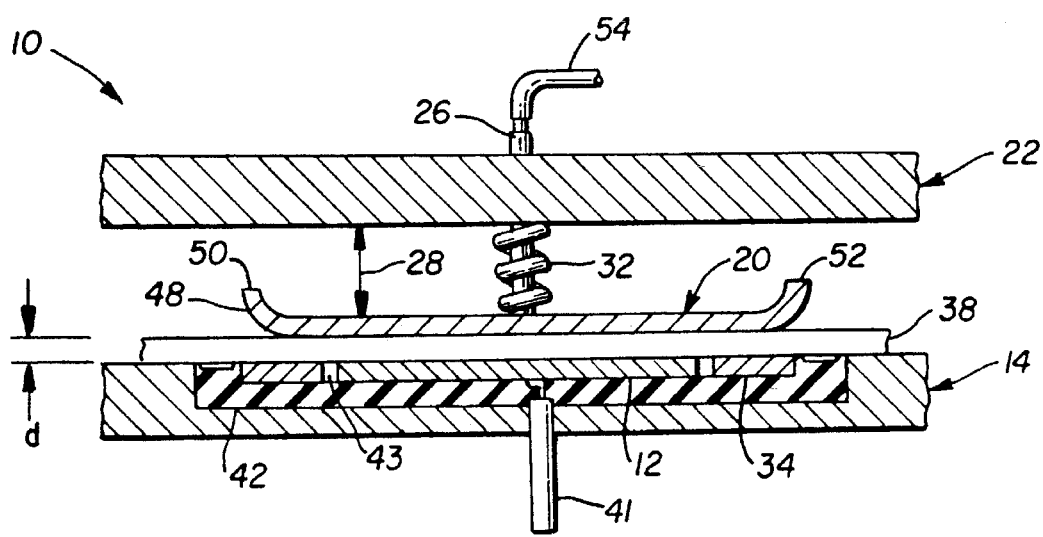
FIG. 2 is a cross-section view in elevation of the page sensor apparatus shown in FIG. 1.

The details of the page sensor apparatus 10 are best seen by referring to FIGS. 1 and 2 simultaneously. As was briefly explained above, the page sensor apparatus 10 comprises a generally rectangular electrically conductive base plate 12 mounted within chassis 14 so that its top surface 16 is substantially flush with the top surface 18 of chassis 14. Base plate 12 may be made from any electrically conductive material, such as copper, aluminum, silver, etc., or any of a wide variety of metal alloys and may be any convenient size and surface area. In one preferred embodiment, base plate 12 is about 10 mm square, yielding a surface area of about 100 mm$^2$. Base plate 12 should be electrically isolated from chassis 14, and may be mounted to chassis 14 with a suitable electrically insulating material, such as an insulating adhesive 42. Base plate 12 may be electrically connected to the capacitance sensing apparatus 40 (FIG. 3) by any suitable means, such as a wire 41.

It is preferred, though not required, that base plate 12 be surrounded by a shield member 34 to reduce non-linear capacitance behavior due to fringing of the electric field (not shown) between plates 12 and 20. In one embodiment, shield member 34 is mounted to chassis 14 by electrically insulating material, such as insulating adhesive 42, so that its top surface 36 is also substantially flush with the top surface 18 of chassis 14. Shield member 34 is separated from base plate 12 by a small gap 43. While the dimensions of gap 43 are not particularly critical, gaps in the range of 0.1 mm to 0.5 mm work well. As was the case for the base plate 12, shield member 34 may be made from any convenient electrically conductive material. Alternatively, if the chassis 14 is electrically conductive, then it may serve as the shield member.

The other plate of the capacitor is formed by generally rectangular foot plate 20, which is movably mounted to frame member 22 so that it is in opposed relation to base plate 12, as is best seen in FIG. 2. More specifically, foot plate 20 is slidably mounted to opposed frame member 22 by a pair of pins 24, 26 which engage respective holes 44, 46 in frame member 22. Thus mounted, foot plate 20 is free to move in the direction of arrow 28. Foot plate 20 may be biased toward base plate 12 by suitable biasing members, such as springs 30, 32. In one preferred embodiment, foot plate 20 and base plate 12 are positioned in touching relationship where there is no paper positioned therebetween. In another embodiment, there may be a small gap, smaller than the thickness of any sheet of paper that is to be sensed, e.g. a gap of 0.05 mm or so. The front surface 48 of foot plate 20 should be coated with an electrically insulating material (not shown), such as an anodized coating, paint, Teflon, or other type of non-conductive material, to prevent it from shorting to base plate 12 when paper 38 is not present between the plates 12 and 20. In one preferred embodiment, foot plate 20 is manufactured from aluminum and the electrically insulating material comprises an anodized surface coating. Alternatively, the top surface 16 of base plate 12 may be coated with an electrically insulating material, or both surfaces 16 and 48 may be coated. Foot plate 20 may also include a pair of turned-up edges 50, 52, to allow the paper 38 to slide between the plates 12 and 20 without the danger of jamming. The foot plate 20 may be electrically connected to the capacitance sensing apparatus 40 (FIG. 3) by any suitable means, such as a wire 54 connected to pin 26. As was the case for base plate 12, foot plate 20 may be of any convenient size and surface area. In one preferred embodiment, foot plate 20 is about 12 mm square, yielding a surface area of about 144 mm$^2$.

The arrangement of the base plate 12 and foot plate 20 is such that the moving paper 38 initially contacts the front edge 48 of foot plate 20 urging it away from base plate 12 in direction 28 until it is spaced at a distance "d" from the base plate 12. Thus, the moving paper causes foot plate 20 to be moved from a first position which in one preferred embodiment is in abutting relationship with base plate 12, to a second position where foot plate 20 is separated from base plate 12 by a distance "d" which is substantially equal to the thickness of paper 38.

Figure 3:
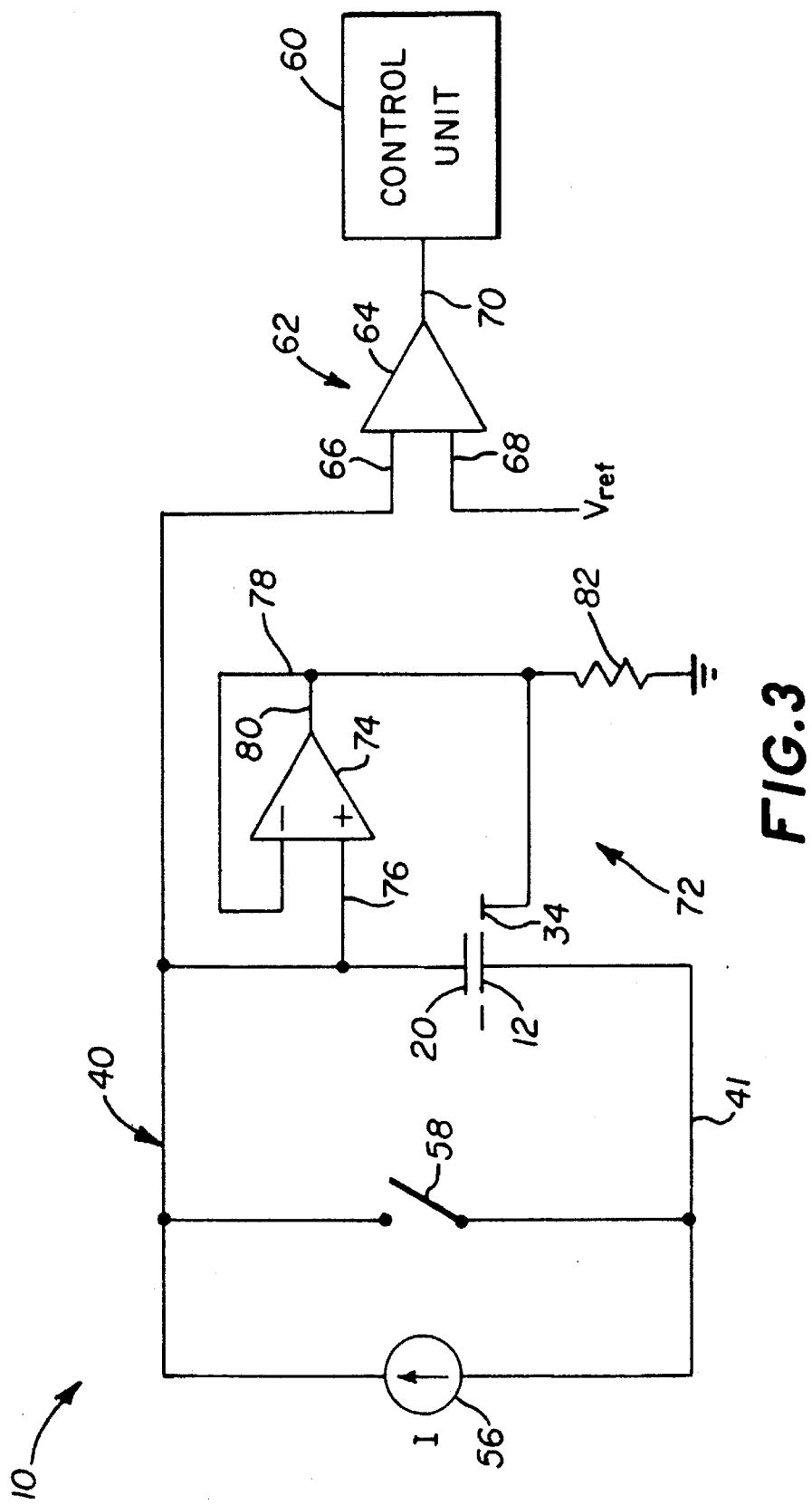
FIG. 3 is an electrical schematic of the capacitance sensing apparatus.

The capacitance sensing apparatus 40 is best seen in FIG. 3 and comprises a current source 56 connected between the base plate 12 and the foot plate 20. Current source 56 may comprise any convenient device capable of producing a constant current having a magnitude I. An electronically controlled switch 58 also connected between plates 12 and 20, and in parallel with current source 56, is controlled by control unit 60 to periodically electrically connect the plates 12 and 20, thus removing the charge therefrom. A comparator circuit 62 connected to the foot plate 20 compares the voltage potential on the foot plate with a known reference voltage $V_{ref}$ and generates an output signal when the voltage potential on foot plate 20 exceeds the reference voltage $V_{ref}$. While many different kinds of comparator circuits could be used to compare the voltage potential on the foot plate 20 with a known reference voltage, as would be obvious to persons having ordinary skill in the art, comparator circuit 62 may comprise an operational amplifier 64 having a variable input line 66 connected to the foot plate 20, and a reference input line 68 connected to the known reference voltage $V_{ref}$. Operational amplifier 64 will generate a signal on output line 70 when the voltage potential on the foot plate 20 exceeds the reference voltage $V_{ref}$.

If a shield member 34 is used to minimize nonlinearity due to the fringe effects of the electric field between base and foot plates 12 and 20, it should be placed at the same electrical potential as foot plate 20. However, to prevent the shield member 34 from draining off a significant amount of the charge on foot plate 20, a voltage follower circuit 72 is used to hold the shield member 34 at substantially the same potential as the foot plate 20. Here again, while many types of voltage follower circuits are well-known in the art and could be used to accomplish the function of voltage follower circuit 72, a convenient voltage follower circuit 72 may comprise an operational amplifier 74 having a non-inverting input 76 connected to the foot plate 20. The output line 80 of operational amplifier 74 is connected to shield member 34 and is also connected to ground through a resistor 82. The inverting input 78 of operational amplifier 74 is also connected to the output line 80, thus making operational amplifier 74 function as a voltage follower.

As mentioned above, the capacitance of base and foot plates 12 and 20 is related to the spacing "d" (FIG. 2) between the plates and is given by the well-known equation:

$$C = \frac{\epsilon A}{d}$$

where:

C=The capacitance;

ε=the dielectric constant of the material separating the plates;

A=the area of the plates; and d=the gap or spacing between the plates.

The capacitance sensing circuit 40 shown in FIG. 3 detects the capacitance of the base and foot plates 12 and 20 by connecting them to constant current source 56. The voltage potential between the plates then increases linearly with time according to the equation:

$$V(t) = \frac{Id}{\epsilon_0 \epsilon_r A} t$$

where:

I=The current produced by current source 56;

d=the spacing between the plates;

$\epsilon_0$=the dielectric constant of free space;

$\epsilon_r$=the dielectric constant of the paper;

A=the area of the base and foot plates 12 and 20; and t=time.

Therefore, the spacing "d" between the base and foot plates 12 and 20, i.e., the thickness of the piece of paper 38 (FIG. 2), may be determined by measuring the time it takes for the voltage between the plates 12 and 20 to reach some reference voltage $V_{ref}$. That is:

$$d = \frac{\epsilon_0 \epsilon_r A}{It} V_{ref}$$

By way of example, assume the total area of the base plate 12 is 100 mm² (0.0001 m²) and the thickness of the paper 38 (i.e., d) is about 0.1 mm (0.001 m). For a current I of 1×10⁻⁶ Amperes, an $\epsilon_0$ equal to about 8.85×10⁻¹² F/m, and an $\epsilon_r$ equal to about 2, then the time t required to reach a reference voltage $V_{ref}$ of 5 volts is about 89 μsec. Shorter times equate to proportionally greater thicknesses, indicating the presence of multiple sheets or thicker paper.

In operation, the control unit 60 may periodically sample the capacitance of base and foot plates 12 and 20 by opening and closing switch 58 at regular intervals and by measuring the time it takes the voltage potential between the plates to reach the reference voltage $V_{ref}$. The control unit 60 may then determine the spacing between the plates during that interval to detect the presence or absence of paper 38, as well as the thickness of the paper 38. Alternatively, the control unit 60 may utilize a conventional paper sensor (not shown) to determine those times when paper 38 is between the plates. Then, control unit 60 would open switch 58 and determine the time required for the voltage on the foot plate 20 to reach the reference voltage $V_{ref}$. The control unit 60 may then use the elapsed time to determine the spacing d between the plates, thus indicating the presence of a single sheet of paper or multiple sheets of paper.

This concludes the detailed description of the preferred embodiments of the page sensor apparatus 10. While a number of specific materials and components were described above for the various embodiments, persons having ordinary skill in the art will readily recognize that other substitute materials and components or combinations of materials and components may be available now or in the future to accomplish comparable functions. For example, while the embodiments shown and described herein utilize a comparator to sense the capacitance of the base and foot plates 12 and 20, an oscillator circuit could instead be used, with the change in capacitance resulting in corresponding changes in oscillator frequency. Likewise, the base and foot plates 12 and 20 may be of any dimensions convenient for the particular installation, and should not be regarded as limited to the particular dimensions shown and described herein.

Consequently, it is contemplated that the inventive concepts herein described may be variously otherwise embodied and it is intended that the appended claims be construed to include alternative embodiments of the invention except insofar as limited by the prior art.

What is claimed is:

1. Page sensor apparatus for producing a signal related to a thickness of a sheet of paper, comprising:

a base plate;

a foot plate positioned in opposed relation to said base plate and arranged to allow the paper to pass therebetween and urge said base plate and said foot plate apart so that said base plate and said foot plate are separated by a distance substantially equal to the thickness of the sheet of paper;

a current source connected between said foot plate and said base plate; and voltage comparator apparatus connected to said foot plate and said base plate for comparing a voltage potential between said foot and base plates with a known reference voltage and for generating a signal related to the voltage potential between said foot and base plates.

2. The apparatus of claim 1, further comprising a shield member surrounding said base plate and coplanar therewith, said shield member being electrically isolated from said base plate.

3. The apparatus of claim 2, further comprising voltage follower apparatus connected to said foot plate and to said shield member for placing a voltage potential on said shield member that is substantially equal to the voltage potential on said foot plate.

4. The apparatus of claim 3, wherein said foot plate is biased toward said base plate.

5. The apparatus of claim 4, wherein said foot plate comprises a generally rectangular plate having a first surface area.

6. The apparatus of claim 5, wherein said base plate comprises a generally rectangular plate having a second surface area.

7. The apparatus of claim 6, wherein the first surface area of said foot plate is greater than the second surface area of said base plate.

8. The apparatus of claim 7, wherein said shield member is separated from said base plate by an air gap.

9. The apparatus of claim 8, wherein said air gap is in the range of 0.1 mm to 0.5 mm.

10. The apparatus of claim 9, wherein the first area of said foot plate is about 144 mm² and wherein the second area of said base plate is about 100 mm².

11. The apparatus of claim 1, wherein said voltage comparator apparatus further comprises a comparator having a variable input, a reference input, and an output, the variable input being connected to said foot plate and the reference input being connected to the known reference voltage, said comparator producing a signal at the output when the voltage potential on said foot plate is greater than the reference voltage.

12. The apparatus of claim 11, further comprising:

switching apparatus connected to said foot and base plates for selectively electrically connecting and disconnecting said foot and base plates; and control apparatus connected to said switching apparatus and to the output of said voltage comparator for actuating said switching apparatus and for detecting the signal at the output of said voltage comparator, said control apparatus also including timer apparatus for determining an elapsed time between when said foot and base plates are electrically disconnected and when the signal from the output of said voltage comparator is detected, the elapsed time being related to the thickness of the sheet of paper.

13. A method of producing a signal related to a thickness of a sheet of paper, comprising the steps of:

moving the sheet of paper between a base plate and a foot plate mounted in opposed relation to the base plate, so that said base and foot plates are separated by a distance that is substantially equal to the thickness of the sheet of paper;

connecting a current source between the base and foot plates at an initial time;

comparing the voltage potential between the foot and base plates with a known reference voltage;

measuring an elapsed time between the initial time and a time when the voltage potential between the foot and base plates exceeds the known reference voltage, the elapsed time being related to the thickness of the sheet of paper; and generating an output signal related to the elapsed time.

14. Page sensor apparatus for producing a signal related to a thickness of a sheet of paper, comprising:

a generally rectangular base plate;

a generally rectangular foot plate positioned in opposed relation to said base plate and arranged to allow the paper to pass therebetween so that said base plate and said foot plate are separated by a distance substantially equal to the thickness of the sheet of paper;

a shield member surrounding said base plate and coplanar therewith, said shield member being electrically isolated from said base plate;

a current source connected between said foot plate and said base plate;

a voltage comparator having a variable input, a reference input, and an output, the variable input being connected to said foot plate and the reference input being connected to a known reference voltage, said voltage comparator producing a signal at the output when a voltage potential on said foot plate is greater than the reference voltage;

a voltage follower connected to said foot plate and to said shield member, wherein said voltage follower places a voltage potential on said shield member that is substantially equal to the voltage potential on said foot plate;

switching apparatus connected to said foot and base plates for selectively electrically connecting and disconnecting said foot and base plates; and control apparatus connected to said switching apparatus and to the output of said voltage comparator for actuating said switching apparatus and for detecting the signal at the output of said voltage comparator, said control apparatus also including timer apparatus for determining an elapsed time between when said foot and base plates are electrically disconnected and when the signal from the output of said voltage comparator is detected, the elapsed time being related to the thickness of the sheet of paper.

* * * * *